(12) United States Patent
Singh et al.

(10) Patent No.: US 6,480,290 B1
(45) Date of Patent: Nov. 12, 2002

(54) METHOD AND APPARATUS TO MEASURE THE CROSS-SECTIONAL AREA OF AN OBJECT

(75) Inventors: Sanjiv Singh, Pittsburgh, PA (US); Bruce Digney, Medicine Hat (CA); Herman Herman, Pittsburgh; Michael Joseph Rondinelli, Bethel Park, both of PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/494,906

(22) Filed: Jan. 31, 2000

(51) Int. Cl.[7] .............................................. G07B 11/28
(52) U.S. Cl. .................. 356/628; 356/638; 250/559.24
(58) Field of Search ................................. 356/638, 639, 356/621, 628; 250/559.22, 559.24

(56) References Cited

U.S. PATENT DOCUMENTS

| | | | |
|---|---|---|---|
| 3,781,115 A | * 12/1973 | Rader et al. | ................. 356/621 |
| 3,806,253 A | 4/1974 | Denton | |
| 4,555,633 A | * 11/1985 | Björkelund | ............ 250/559.15 |
| 4,612,656 A | 9/1986 | Suzuki et al. | |
| 4,800,652 A | 1/1989 | Ballas et al. | |
| 4,849,643 A | * 7/1989 | Mundy | .................. 250/559.15 |
| 4,895,449 A | 1/1990 | Marshall | |
| 4,913,551 A | 4/1990 | Davis | |
| 5,008,555 A | * 4/1991 | Mundy | .................. 250/559.22 |
| 5,022,162 A | 6/1991 | Luikko | |
| 5,884,240 A | * 3/1999 | Edgar et al. | ................. 702/157 |
| 5,949,086 A | 9/1999 | Reponen et al. | |

* cited by examiner

Primary Examiner—Richard A. Rosenberger
(74) Attorney, Agent, or Firm—Kirkpatrick & Lockhart LLP

(57) ABSTRACT

An apparatus for determining a cross-sectional area of an object. The apparatus includes a plurality of radiant energy sources, a plurality of radiant energy detectors oriented to receive radiant energy emitted by the plurality of radiant energy sources, a strobing module in communication with the plurality of radiant energy sources for strobing the plurality of light sources, and a profile determination module in communication with the plurality of radiant energy sources and the strobing module for determining the cross-sectional area of an object disposed between the plurality of radiant energy sources and the plurality of radiant energy detectors.

20 Claims, 15 Drawing Sheets

US 6,480,290 B1

METHOD AND APPARATUS TO MEASURE THE CROSS-SECTIONAL AREA OF AN OBJECT

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention generally relates to photonics and, more particularly, to apparatuses and methods for measuring cross-sectional areas of objects.

2. Description of the Related Art

In many businesses, the cross-sectional area of an object must be measured and recorded during the course of normal operations of the business. For example, in the nursery business growers of shade trees are periodically required to determine and record information about each tree on their grounds. Information which is critical to the efficient operation of the nursery includes, for example, the diameter of the tree, the exact location of the tree on the grounds, and the grade or quality of the tree. The need for speed and accuracy in determining and recording the information is of vital importance to the economic success of the nursery. The gathered information is typically maintained in a computerized inventory system which is consulted by nursery managers when filling orders and estimating future tree stock.

In the inventory process used by many nurseries, a field worker must determine the location of a given tree, grade the tree, measure the tree, and hand transcribe the information into a paper logbook. Many nurseries perform the measuring operation with a measurement device that uses a flat metal template with notches of varying width to approximate the diameter of the tree. The diameter of the tree is considered to be equal to the narrowest set of notches on the template between which the tree fits. Although the trunk size of commercial trees range in size from less than one inch in diameter to greater than ten inches in diameter, a typical nursery is interested in a range of diameters from 0.5 to 3.5 inches. For this range of trunk diameters, a measurement error of less than 0.25 inch is desired. As tree trunk cross sections are usually more oblong than circular, the use of a notched template will yield different tree diameters when measured from different directions. Also, the naturally rough tree bark surface makes consistent fitting of the notched template difficult. These problems all result in inconsistent tree measurements that change with the operator performing the measurement. In addition, the transcription of information into a logbook and the subsequent manual entry into a computerized inventory system is time consuming, expensive, and prone to errors.

Alternatively, some tree growers perform the measuring operation with a device that utilizes a mechanical caliper that is attached to an onboard processor. The diameter of the tree is calculated based on the position of the calipers in contact with the tree. Given the diameter of the tree, the cross-sectional area may be approximated by assuming the tree is circular in shape. The onboard processor also permits entry of data such as the location and quality grade of the tree. The data may then be downloaded from the onboard processor to an inventory management computer of the nursery. Thus, although this device eliminates some of the potential errors associated with the manual transcription of data, the device is expensive and the accuracy of the device is limited to measuring only circular cross-sections of objects.

Accordingly, there exists a need for an accurate and cost effective manner to determine the cross-sectional area of an object.

BRIEF SUMMARY OF THE INVENTION

The present invention is directed to an apparatus for determining a cross-sectional area of an object. According to one embodiment, the apparatus includes a plurality of radiant energy sources, a plurality of radiant energy detectors oriented to receive radiant energy emitted by the plurality of radiant energy sources, a strobing module in communication with the plurality of radiant energy sources for strobing the plurality of light sources, and a profile determination module in communication with the plurality of radiant energy sources and the strobing module for determining the cross-sectional area of an object disposed between the plurality of radiant energy sources and the plurality of radiant energy detectors.

According to another embodiment, the present invention is directed to an apparatus for determining a cross-sectional area of an object that engages both sides of a V-shaped opening, including a range finder located a known distance from a vertex of the V-shaped opening, and a profile determination module in communication with the range finder.

The present invention represents an advancement over prior methods and apparatuses used to determine the cross-sectional area of an object, such as a tree trunk, in that it is more accurate due to the fact that the object does not have to be assumed to be circular in shape. In addition, the present invention represents an advancement in that it is efficient and relatively inexpensive. These and other benefits of the present invention will be apparent from the detailed description hereinbelow.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

Figure 1:
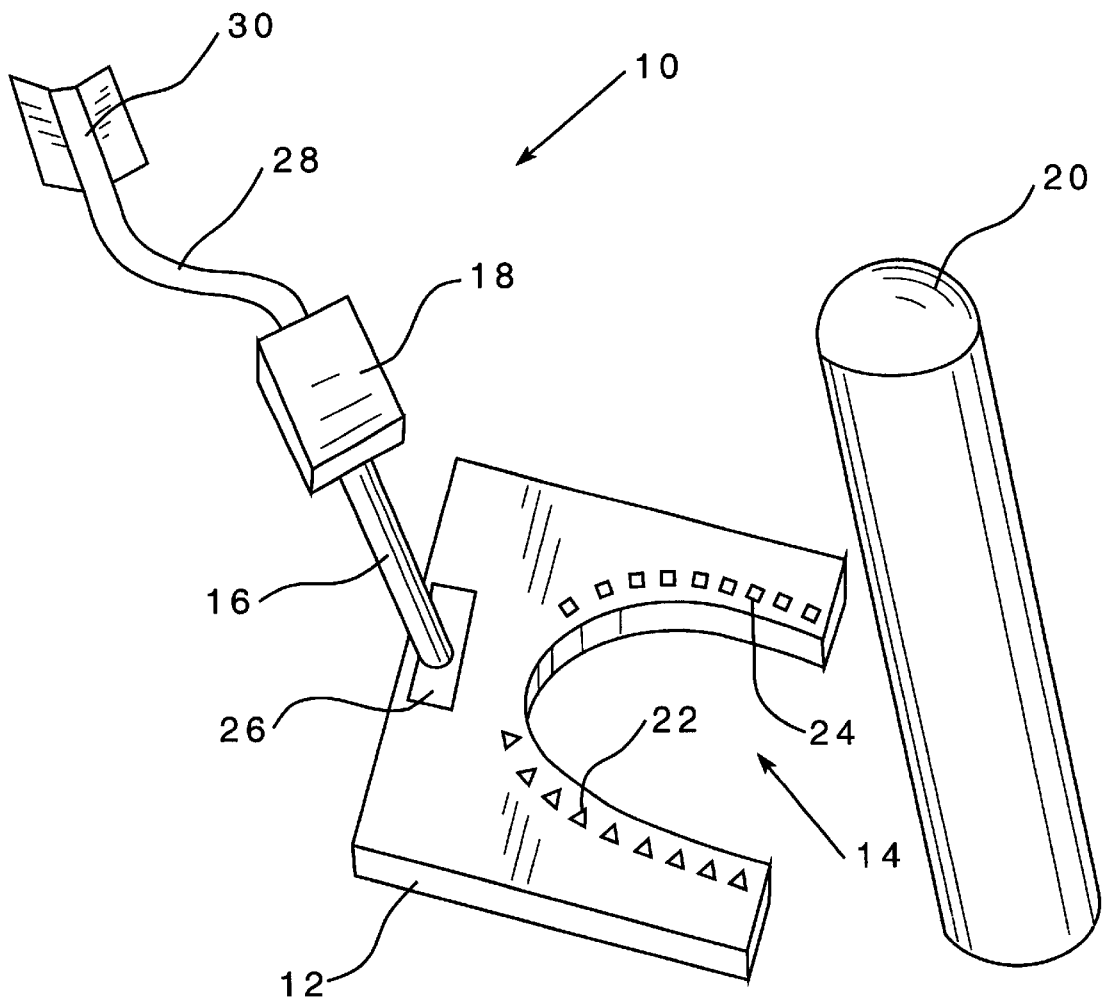
FIG. 1 is a diagram illustrating a cross-sectional measurement device according to one embodiment of the present invention.

FIG. 1 is a diagram illustrating a cross-sectional measurement device 10 according to one embodiment of the present invention. The device 10 includes a sensor head 12 having an opening 14, a handle 16, and a controller 18. The apparatus 10 may be used to determine the cross-sectional area of an object 20, such as a tree trunk, disposed within the opening 14 of the sensor head 12.

The sensor head 12 may be, for example, a printed circuit board, and may include a number of radiant energy sources 22 and a number of radiant energy detectors 24 connected thereto around the opening 14. According to one embodiment, the sources 22 and the detectors 24 may be positioned on generally opposite sides of the sensor head 12, as illustrated in FIG. 1. According to another embodiment, the sources 22 and detectors 24 may be positioned on the sensor head 12 such that the sources 22 and the detectors 24 are placed in alternating positions on the sensor head 12. The opening of the sensor head 14 is large enough to permit the partial encircling of the object 20 by the sensor head 12, such that the object 20 may be disposed between the sources 22 and the detectors 24. The device 10 will be described herein as an apparatus for determining the cross-sectional area of an object disposed within the opening 14 of the sensor head 12. However, it should be understood that the benefits of the present invention may be realized for measuring the cross-sectional area of any concave and opaque object disposed between the sources 22 and detectors 24, and the present invention not limited to embodiments where the sources 22 and detectors 24 are connected to a sensor head 12.

The radiant energy sources 22 may be any diffused light source such as, for example, infrared light emitting diodes (LEDs), diffused diode lasers, or fluorescent lights. Radiant energy emitted by the radiant energy sources 22 may propagate through space towards the radiant energy detectors 24. The radiant energy detectors 24 may be any device capable of sensing the presence of radiation such as, for example, photo-detectors or infrared detectors, and are oriented to sense the radiant energy emitted from the radiant energy sources 22. The radiant energy detectors 24 may also include filters (not shown), such as passband filters, tuned to the frequency of light energy emitted by the radiant energy sources 22 such that light energy outside of the passband range, such as from extraneous light sources, are filtered out.

The radiant energy sources 22 and the radiant energy detectors 24 may be positioned on the sensor head 12 around the opening 14 such that the object 20 disposed in the opening 14 will block some or all of the radiant energy detectors 24 from detecting the radiant energy emitted from any particular radiant energy source 22. Each of the sources 22 and the detectors 24 are in communication with the controller 18, which determines the cross-sectional area of the object based on which radiant energy detectors 24 sense the radiated energy from each of the radiant energy sources 22, as described hereinbelow. The sources 22 and the detectors 24 may be connected to the controller 18 by wires running from the sensor head 12 along or within the handle 16 to the controller 18. According to another embodiment, the sources 22 and the detectors 24 may communicate with the controller 18 by radio signals. The controller 18 may output a signal to energize the radiant energy sources 22 causing the sources 22 to emit radiant energy, and the controller 18 may receive signals from the radiant energy detectors 24 indicating that the detectors 24 have sensed radiant energy emitted from one of the radiant energy sources 22.

The arrangement and the quantity of the radiant energy sources 22 and the radiant energy affect the accuracy of the cross-sectional area measurements of the object 20. Utilizing a greater quantity and more densely arranged radiant energy sources 22 and radiant energy detectors 24 provides greater resolution of the cross-sectional area of the object 20. The sensor head 12 may include, for example, thirty-two radiant energy sources 22 and twenty-four radiant energy detectors 24, although according to other embodiments of the present invention, more or less radiant energy sources 22 and radiant energy the detectors 24 may be utilized. The sources 22 and detectors 24 may be spaced, for example, 0.25 inch apart. In addition, the number of sources 22 and the number of detectors 24 may or may not be equal. For an embodiment of the present invention in which the sources 22 and the detectors 24 are arranged according to a linear paired arrangement, as described hereinbelow in conjunction with FIGS. 3 and 4, the number of sources 22 and the number of detectors 24 may be equal. However, for embodiments of the present invention in which the sources 22 and the detectors 24 are arranged according to, for example, a linear non-paired arrangement, as described hereinbelow in conjunction with FIGS. 5 and 6, or a non-linear non-paired arrangement, as described hereinbelow in conjunction with FIGS. 7 and 8, the number of sources 22 and the number of detectors 24 may or may not be equal.

The handle 16 may be, for example, a tubular aluminum or graphite shaft connected to the sensor head 12 by a bracket 26. The bracket 26 may serve as the mechanical interface between the sensor head 12 and the handle 16. The handle 16 may extend upward from the sensor head 12 to facilitate a user in moving the device 10. The handle 16 may further include, for example, a user hand grip portion 28 and a user arm support portion 30. The user hand grip portion 28 may include an exterior covering to assist the user in maintaining a secure grip of the device 10. The user arm support portion 30 may include, for example, a padded portion which rests against the arm of the user. The user hand grip portion 28 and the user arm support portion 30 may be used by the operator of the device 10 to assist the operator in the control and positioning of the device 10 relative to, for example, the object 20. As discussed hereinbefore, wires from the sensor head 12 may run along or within the handle 16 to the controller 18.

Figure 2:
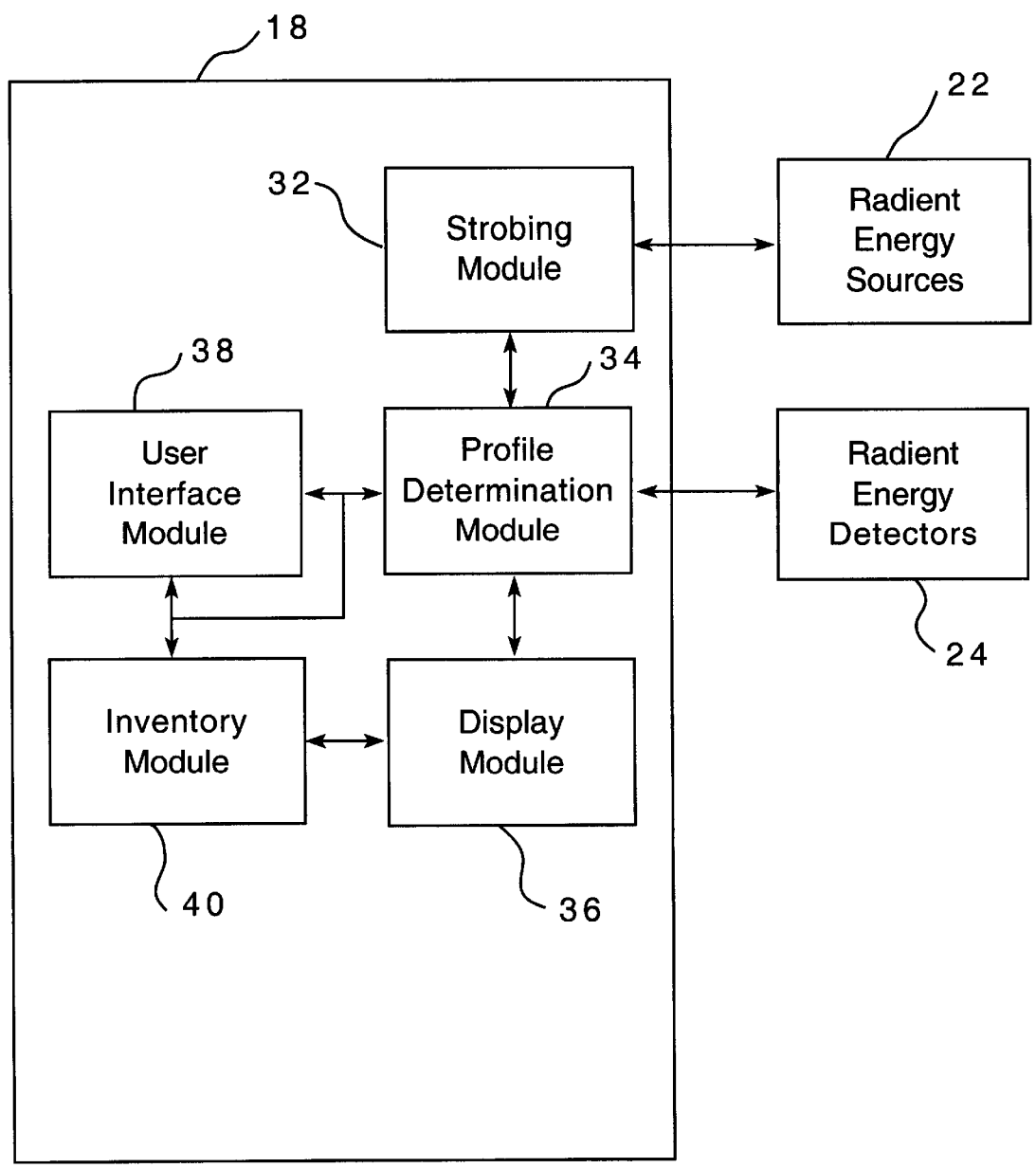
FIG. 2 is a block diagram of the controller of the device of FIG. 1 according to one embodiment of the present invention.

FIG. 2 is a block diagram of the controller 18 of the device 10 according to one embodiment of the present invention. The controller 18 may be implemented as, for example, a computer, such as a workstation or a personal computer, a microprocessor, or an application specific integrated circuit (ASIC). The controller 18 includes a strobing module 32, a profile determination module 34, a display module 36, a user interface module 38, and an inventory module 40. The modules 32, 34, 36, 38, and 40 may be implemented as software code to be executed by the controller 18 using any type of computer instruction type suitable such as, for example, microcode, and can be stored in, for example, an electrically erasable programmable read only memory (EEPROM), or can be configured into the logic of the controller 18. According to another embodiment, the modules 32, 34, 36, 38, and 40 may be implemented as software code to be executed by the controller 18 using any suitable computer language such as, for example, C or C++ using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The strobing module 32 is in communication with the radiant energy sources 22 and outputs a signal for strobing the radiant energy sources 22 (i.e., energizing the sources 22 in succession to emit radiant energy one at a time). The sources 22 are strobed by the strobing module 32 in order that the controller 18 may determine which of the radiant energy detectors 24 sense the radiant energy emitted by each of the sources 22. The strobing module 32 may strobe the sources 22 at a rate of, for example, 38 KHz, although by using a greater strobing rate such as, for example, 1 MHz, errors associated with movements of the sensor head 12 during the strobing of the sources 22 may be reduced.

The profile determination module 34 is in communication with the strobing module 32 (and hence the sources 22) and the radiant energy detectors 24, and estimates the cross-sectional area of the object 20 disposed between the sources 22 and the detectors 24. The profile determination module 34 estimates the cross-sectional area of the object 20 based on which detectors 24 sense radiant energy emitted by the radiant energy sources 22 and which detectors 24 do not sense radiant energy for each of the strobed radiant energy sources 22 because of the opaque characteristics of the object 20, as described further hereinbelow.

The display module 36 is in communication with the profile determination module 34, and outputs a graphical image of the cross-sectional area of the object 20 based on the estimate produced by the profile determination module 34. The display module 36 may, for example, display the graphical image on an LCD display of the controller 18.

The user interface module 38 is in communication with the profile determination module 34, and receives data input from a user of the device 10 to the controller 18. The user interface module 38 may be, for example, a graphical user interface (GUI), that permits the user to input the location of the object 20 and its quality grade. This data may be associated with the cross-sectional area of the object 20 as determined by the profile determination module 34.

The inventory module 40 is in communication with the profile determination module 34 and the user interface module 38, and associates the cross-sectional area of the object 20 with the data input by the user via the user interface module 38. The inventory module 40 may, for example, store the data in a memory unit of the controller 18, and may permit the downloading of the data from the controller 18 to another computing device, such as an inventory management computer of a nursery.

As illustrated in FIG. 1, the device includes a single controller 18. However, according to other embodiments of the present invention, the device 10 may include two or more separate controllers 18 with each controller 18 including at least one of the modules 32, 34, 36, 38, and 40. For example, the strobing module 32 and the profile determination module 34 may be included in one or more microcontrollers (not shown) such as, for example, Basic Stamp® microcontrollers (Basic Stamp® is a registered trademark of Parallax Inc., Rocklin, Calif.). According to such an embodiment, the microcontrollers may be connected to the sensor head 12 and be in communication with the radiant energy sources 22 and the detectors 24 via wiring on the sensor head 12.

The display module 36, the user interface module 38, and the inventory module 40 may be included, for example, in a personal digital assistant (PDA), such as one of the Palm Pilot series of PDAs manufactured by 3COM Corporation, Santa Clara, Calif. According to such an embodiment, the PDA may be connected to the handle 16 in a position for easy visual access by a user of the device 10. The PDA can be connected to the strobing module 32 and the profile determination module 34 via an RS-232 connection.

Figure 3:
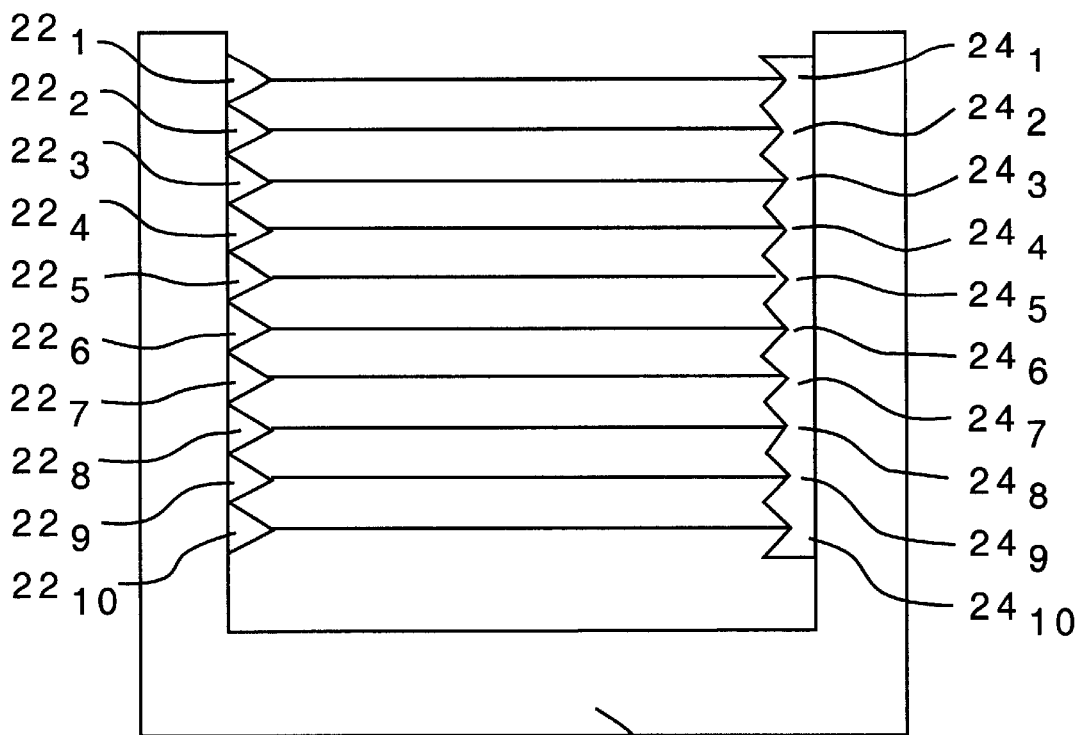
FIG. 3 is a diagram of a linear paired arrangement of the radiant energy sources and the radiant energy detectors of the device of FIG. 1.
Figure 4:
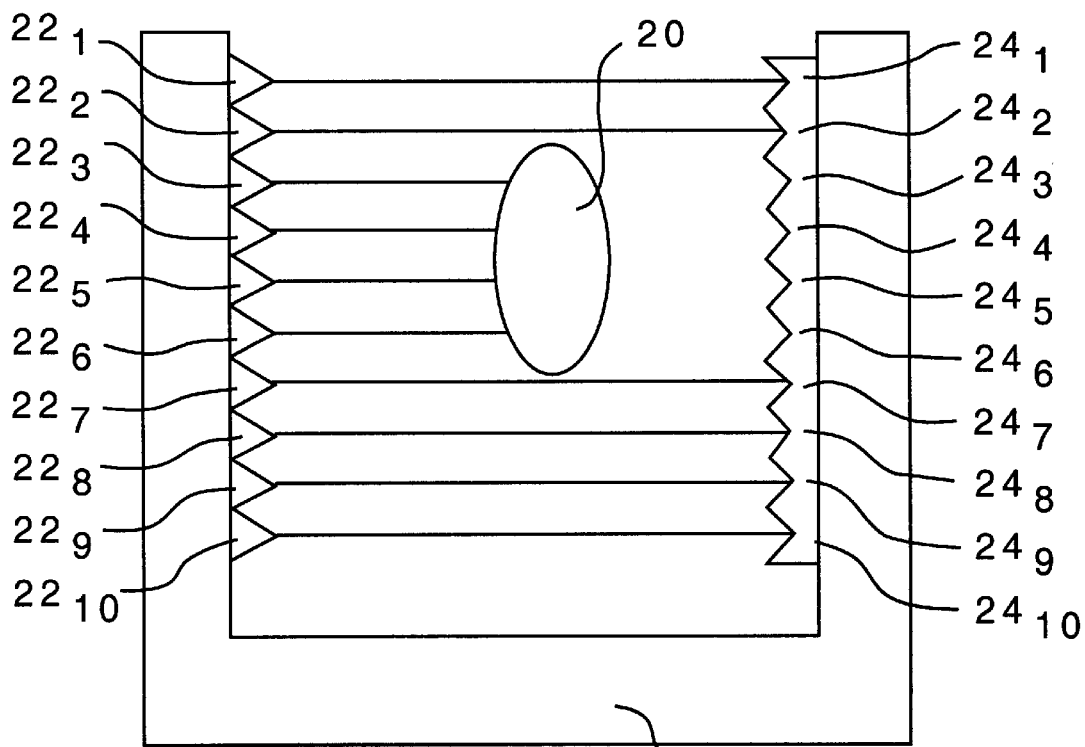
FIG. 4 is a diagram of the linear paired arrangement of FIG. 3 with an object disposed within the opening of the sensor head of the device of FIG. 1.

FIG. 3 illustrates a linear paired arrangement of the radiant energy sources $22_{1-10}$ and the radiant energy detectors $24_{1-10}$, and FIG. 4 illustrates a graphical example in which a linear paired arrangement is used to estimate the cross-sectional area of the object 20 disposed between the radiant energy sources $22_{1-10}$ and the detectors $24_{1-10}$. According to such an embodiment, the profile determination module 34 estimates the cross-sectional area of the object based upon whether an individual radiant energy detector of the detectors $24_{1-10}$ senses the radiant energy emitted by a radiant energy source of the sources $22_{1-10}$ opposed to that radiant energy detector. Accordingly, for such an embodiment, the number of radiant energy sources 22 may equal the number of radiant energy detectors 24.

As illustrated in FIG. 4, the object 20 may block certain of the radiant energy detectors $24_{1-10}$ from sensing the radiant energy emitted by its oppositely-paired radiant energy source $22_{1-10}$. For the embodiment illustrated in FIG. 4, the profile determination module 34 may estimate the diameter of the object 20 as the distance between the radiant energy detector $24_2$ and radiant energy detector $24_7$. The cross-sectional area of the object 20 may be determined based on the estimated diameter by assuming that the object is circular.

Utilizing the linear paired arrangement of radiant energy sources $22_{1-10}$ and radiant energy detectors $24_{1-10}$ to determine the cross-sectional area of the object 20 results in an estimate which is based only on the surface of the object 20 that is perpendicular to the radiant energy emitted from the radiant energy sources $22_{1-10}$. To achieve a more accurate estimation of the cross-sectional area of the object 20 using the linear paired arrangement, the operator of the device 10 may position the device 10 for example, such that it is perpendicular to the axis of the object 20 and by, for example, assuming the object is elliptical.

Figure 5:
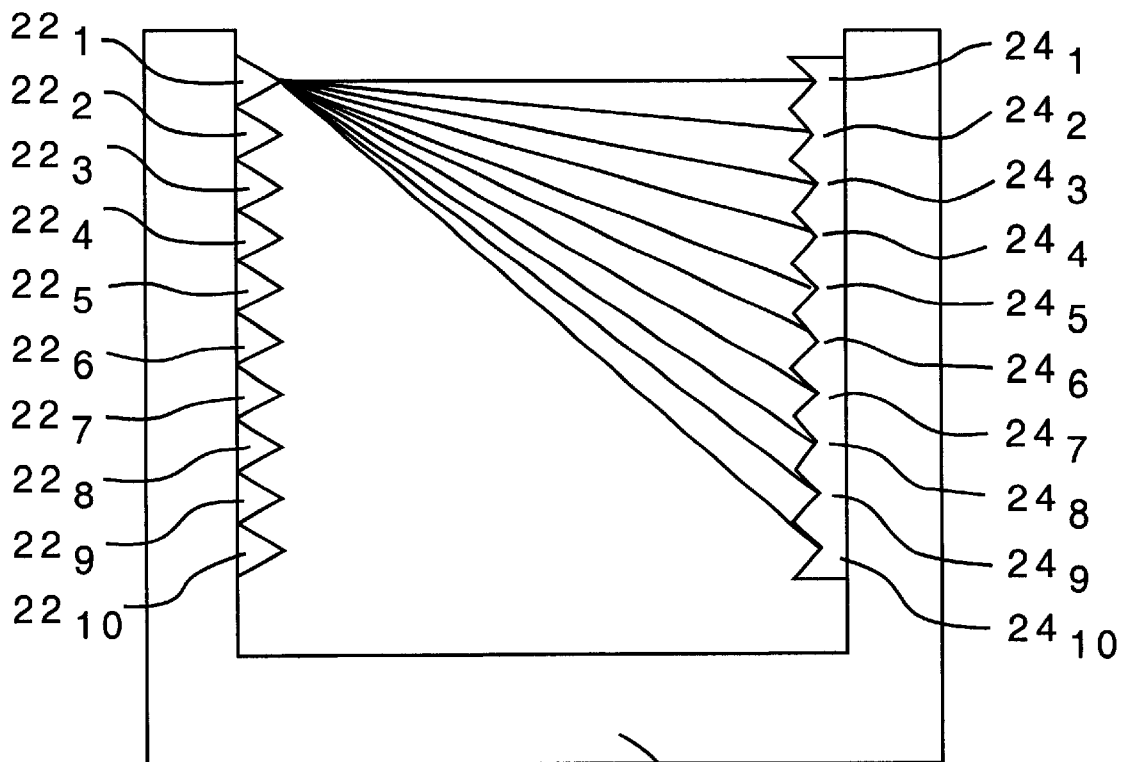
FIG. 5 is a diagram of a linear non-paired arrangement of the radiant energy sources of the radiant energy detectors of the device of FIG. 1.
Figure 6:
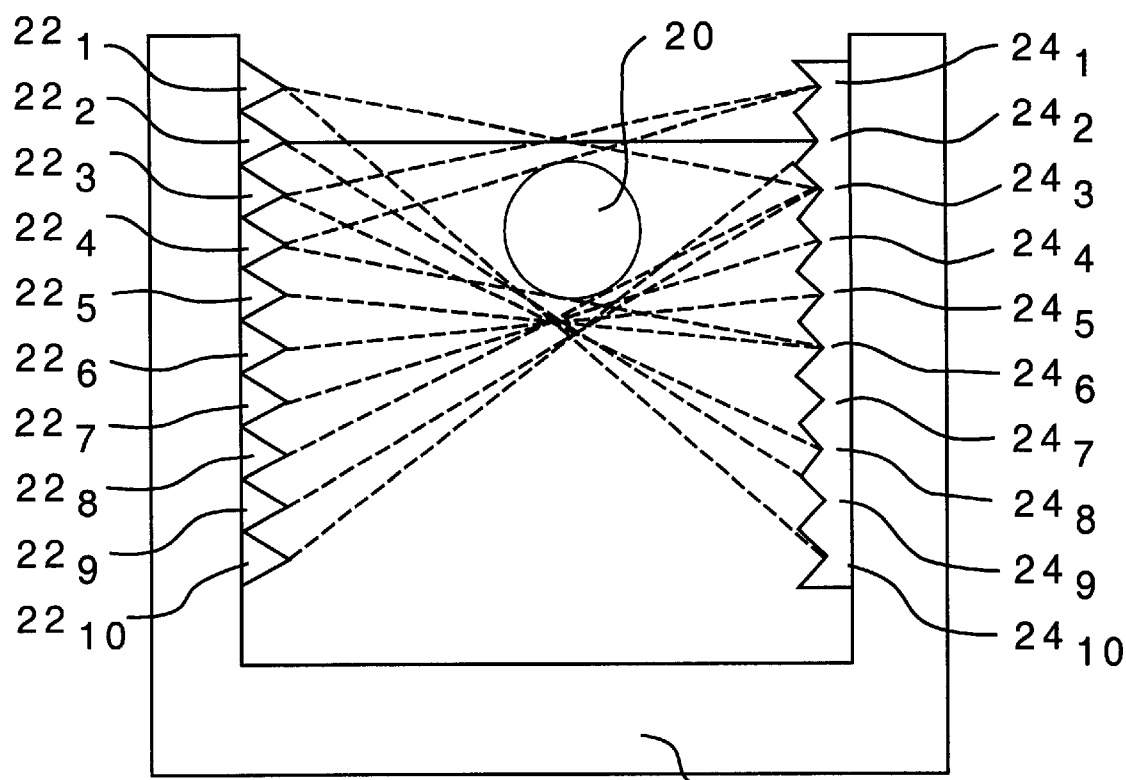
FIG. 6 is a diagram of the linear non-paired arrangement of FIG. 5 with an object disposed within the opening of the sensor head of the device of FIG. 1.

FIG. 5 illustrates a linear non-paired arrangement of the radiant energy sources $22_{1-10}$ and the radiant energy detectors $24_{1-10}$ and FIG. 6 illustrates a graphical example of utilizing the linear non-paired arrangement to estimate the cross-sectional area of the object 20 disposed between the radiant energy sources $22_{1-10}$ and the detectors $24_{1-10}$. According to this embodiment, the radiant energy emitted by each of the radiant energy sources $22_{1-10}$ may be sensed by each of the radiant energy detectors $24_{1-10}$, rather than just the detector $24_{1-10}$ opposite the source $22_{1-10}$. For such an embodiment, the number of radiant energy sources $22_{1-10}$ and the number of radiant energy detectors $24_{1-10}$ may or may not be equal.

By utilizing the linear non-paired arrangement, as illustrated in FIG. 6, the estimate of the cross-sectional area of the object 20 determined by the profile determination module 34 may be more accurate in comparison to the estimate obtained utilizing the linear paired arrangement, as discussed hereinbefore with respect to FIGS. 3 and 4. This is because using the linear nonpaired arrangement does not require that the length of an axis of the object 20 be approximated as the distance between the radiant energy sources $24_{1-10}$ that do not detect light energy as in the linear paired arrangement. Rather, using the linear non-paired arrangement, the profile determination module 34 may determine the object diameter more accurately and some indication of the shape, such as other than circular, of the object 20 may be detected, as described hereinbelow.

Figure 7:
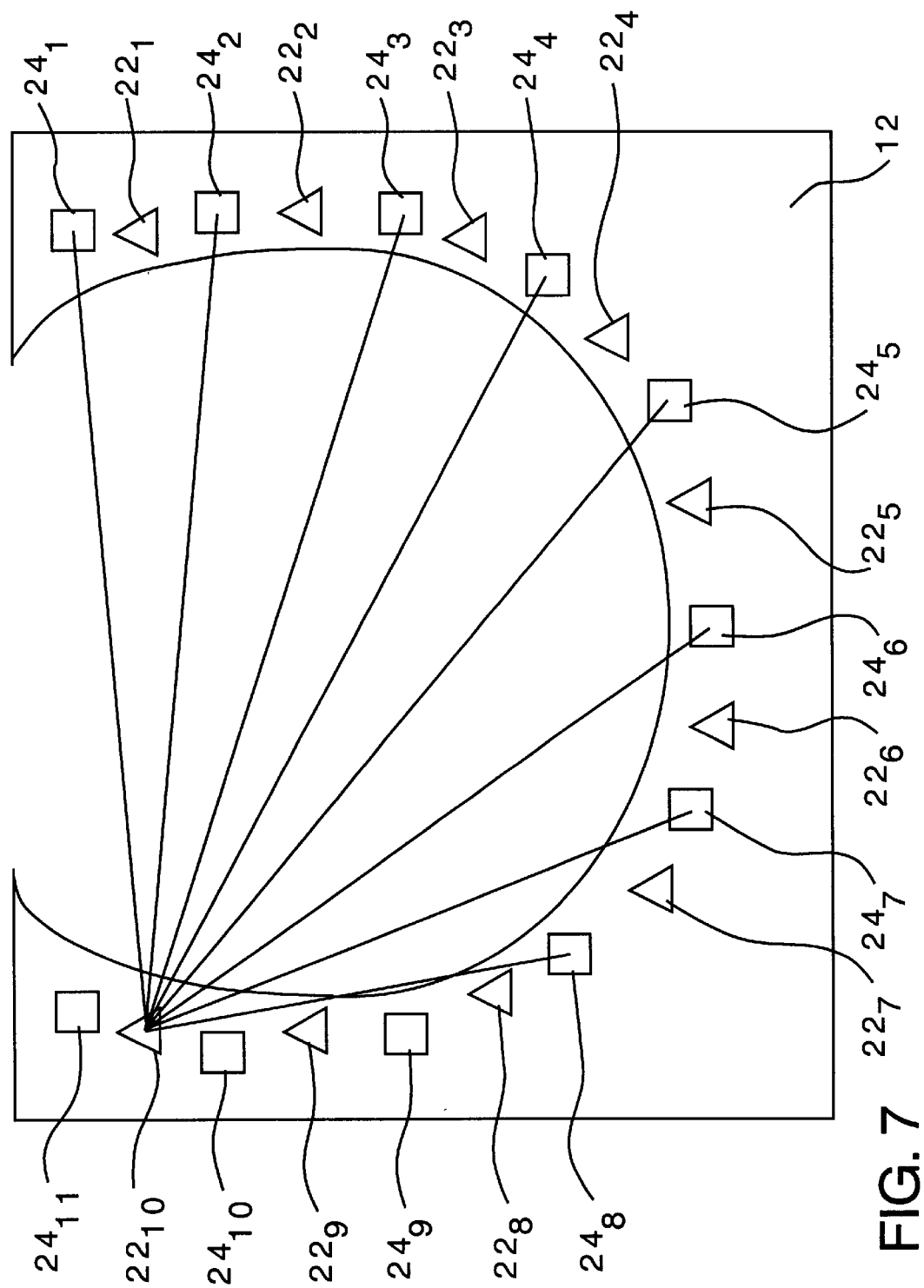
FIG. 7 is a diagram of a non-linear non-paired arrangement of the radiant energy sources and the radiant energy detectors of the device of FIG. 1.
Figure 8:
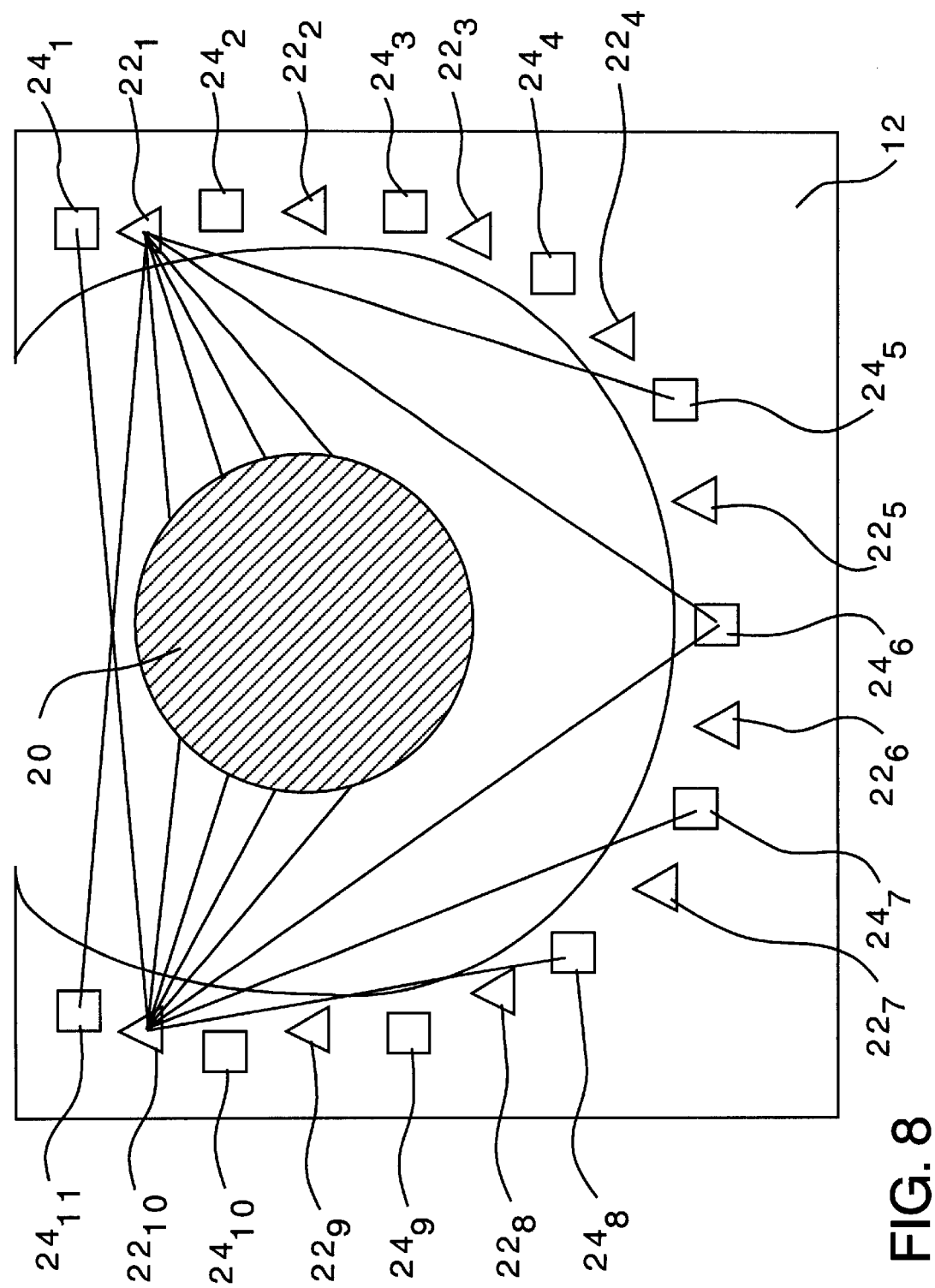
FIG. 8 is a diagram of the non-linear non-paired arrangement of FIG. 7 with an object disposed within the opening of the sensor head of the device of FIG. 1.

FIG. 7 illustrates a non-linear non-paired arrangement of the radiant energy sources $22_{1-10}$ and the radiant energy detectors $24_{1-11}$, and FIG. 8 illustrates a graphical example of utilizing the non-linear non-paired arrangement to estimate the cross-sectional area of the object 20 disposed between the radiant energy sources $22_{1-10}$ and the detectors $24_{1-11}$ According to this embodiment, the radiant energy emitted by each of the radiant energy sources $22_{1-10}$ may be sensed by each of the radiant energy detectors $24_{1-11}$. In addition, for such an embodiment, the number of radiant energy sources $22_{1-10}$ and radiant energy detectors $24_{1-11}$ may or may not be equal. As illustrated in FIGS. 7 and 8, for the non-linear non-paired arrangement, the radiant energy sources $22_{1-10}$ and the radiant energy detectors $24_{1-11}$ may be arranged in a curved (i.e., non-linear) fashion around the opening 14 of the sensor head 12 (and hence the object 20 disposed within the opening 14). Utilizing the non-linear non-paired arrangement of radiant energy sources 22 and radiant energy detectors 24 to determine the cross-sectional area of the object 20 results in an estimate which is more accurate than the estimate obtained from utilizing either a linear paired or a linear non-paired arrangement of radiant energy sources 22 and radiant energy detectors 24 because, due to the non-linear arrangement of the radiant energy sources $22_{1-10}$ and the radiant energy detectors $24_{1-11}$ information about the two-dimensional shape of the object 20 may be gained from a greater number of observation points relative to the object 20.

Figure 9:
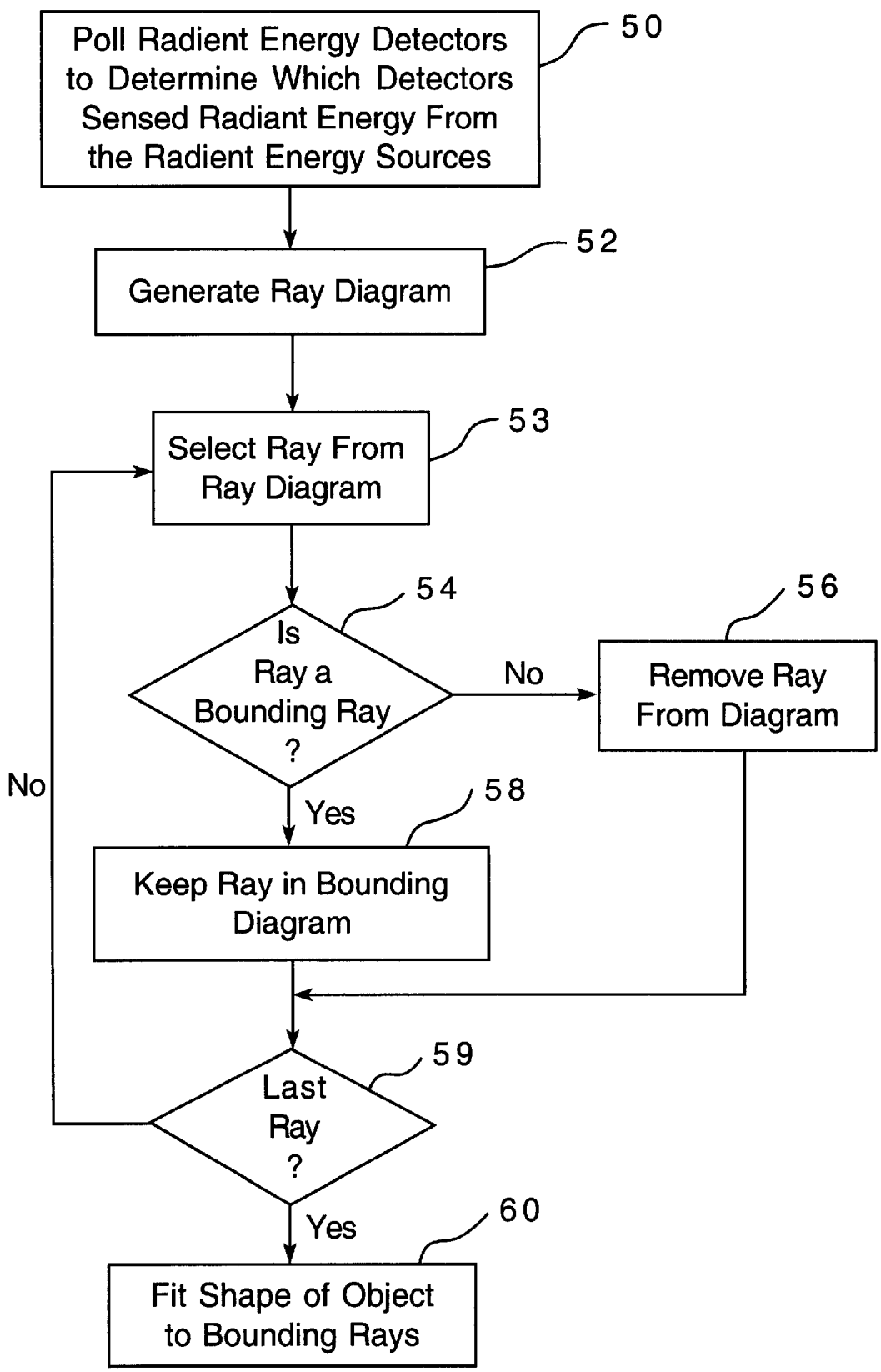
FIG. 9 is a block diagram of a process flow through the profile determination module of FIG. 2 according to one embodiment of the present invention.

FIG. 9 is a block diagram of a process flow through the profile determination module 34 of the controller 18 according to one embodiment of the present invention, referred to as the "bounding ray" method. The process flow begins at block 50, where radiant energy detectors 24 are polled to determine which of the detectors 24 sensed radiant energy from each of the radiant energy sources 22 as the sources 22 were strobed by the strobing module 32.

Figure 10:
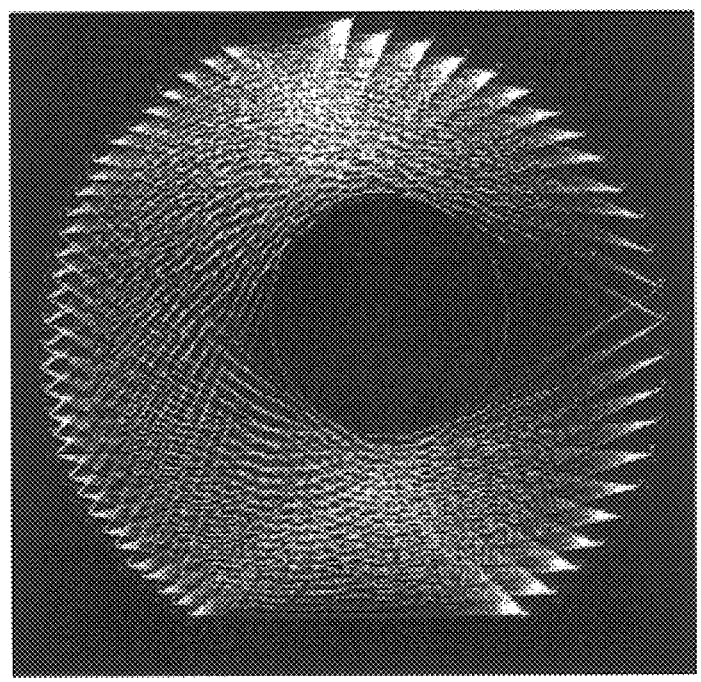
FIG. 10 is an example of a ray diagram according to one embodiment of the present intention.

From block 50, the process flow proceeds to block 52, where a ray diagram is generated based on the polling of the radiant energy detectors 24. An example of a ray diagram is illustrated in FIG. 10. The ray diagram is generated by establishing a ray between each sensor 22/detector 24 pair for which the detector 24 sensed radiant energy emitted by the particular sensor 22, i.e., each sensor 22/detector 24 pair having "a clear line of sight" and not blocked by the object 20.

Figure 11:
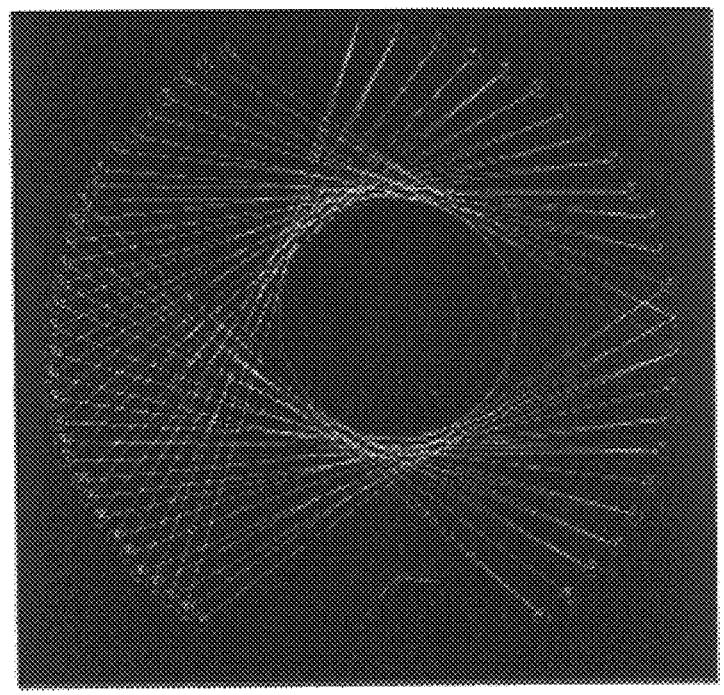
FIG. 11 is a bounding ray diagram of the ray diagram of FIG. 10.

From block 52, the process flow proceeds to block 53, where a ray is selected. At block 54 it is determined whether the ray is a bounding ray, i.e., a ray having a point tangent to a surface of the object 20. Whether a particular ray is a bounding ray may be determined, for example, by whether the ray is on the shadow edge of a group of rays. If the ray is not on the shadow edge, it is not a bounding ray, and the process flow proceeds to block 56, where the ray is removed from the diagram. Conversely, if the ray is on the shadow edge, it may be considered a bounding ray, and the process flow advances to block 58, where the ray is kept in the diagram. The flow proceeds to block 59, where it is determined if the ray is the last ray in the ray diagram. If not, the flow returns to block 53, where the next ray is selected. If the ray is the last ray, all the non-bounding rays have been removed, the result is a bounding ray diagram, including only rays having a point tangent to the object 20, as illustrated in FIG. 11.

Figure 12:
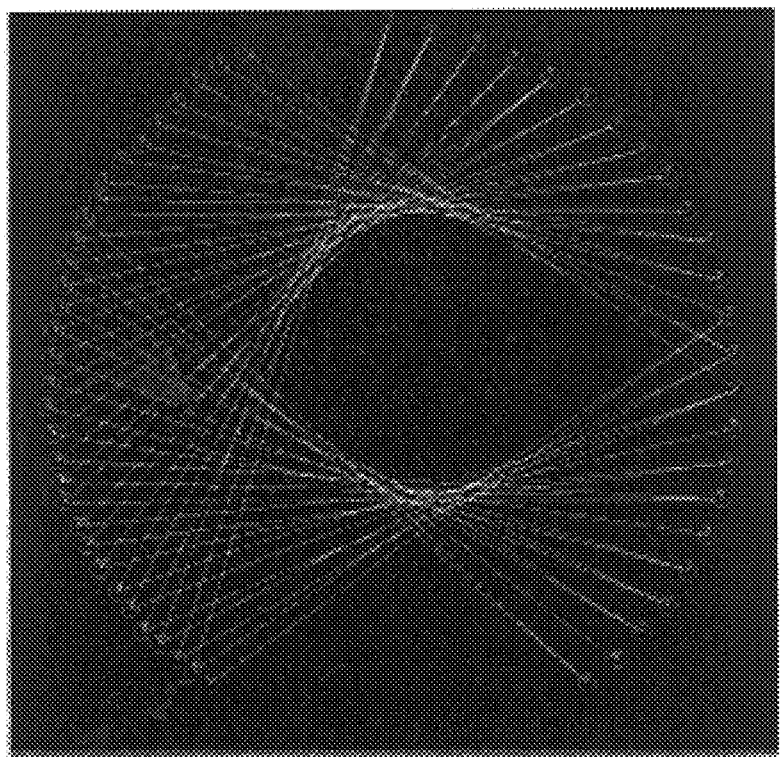
FIG. 12 is the bounding ray diagram of FIG. 11 having a cross-sectional area of an object fit within the bounding rays according to one embodiment of the present invention.

Having generated the bounding ray diagram, the process flow advances to block 60, where the shape of the object 20 is "fit" to the bounding ray diagram. To fit the shape to the bounding diagram, it may be assumed that each bounding ray contains a single point tangent to a surface of the object 20. By fitting a parameterized object model to be tangent to all of the bounding rays, the shape of the object may be determined. In this analysis, the profile determination model 34 may assume that the object 20 is circular, elliptical, or some more complex generally-concave shape. More accurate determinations of the object shape may be obtained from as some more complex geometries, however, processing time typically will also increase with such assumptions. According to one embodiment, a minimization function such as, for example, Powell's function minimization, may be implemented to fit the object model to the bounding rays. Powell's function minimization is described in Press et al., *Numerical Recipes in C*, Cambridge University Press, 1992,§ 10.5, pp. 412–420, which is incorporated herein by reference. FIG. 12 is a diagram of fitting the two-dimensional shape of the object 20 having a circular cross-section to the bounding diagram of FIG. 11 using Powell's function minimization.

Figure 13:
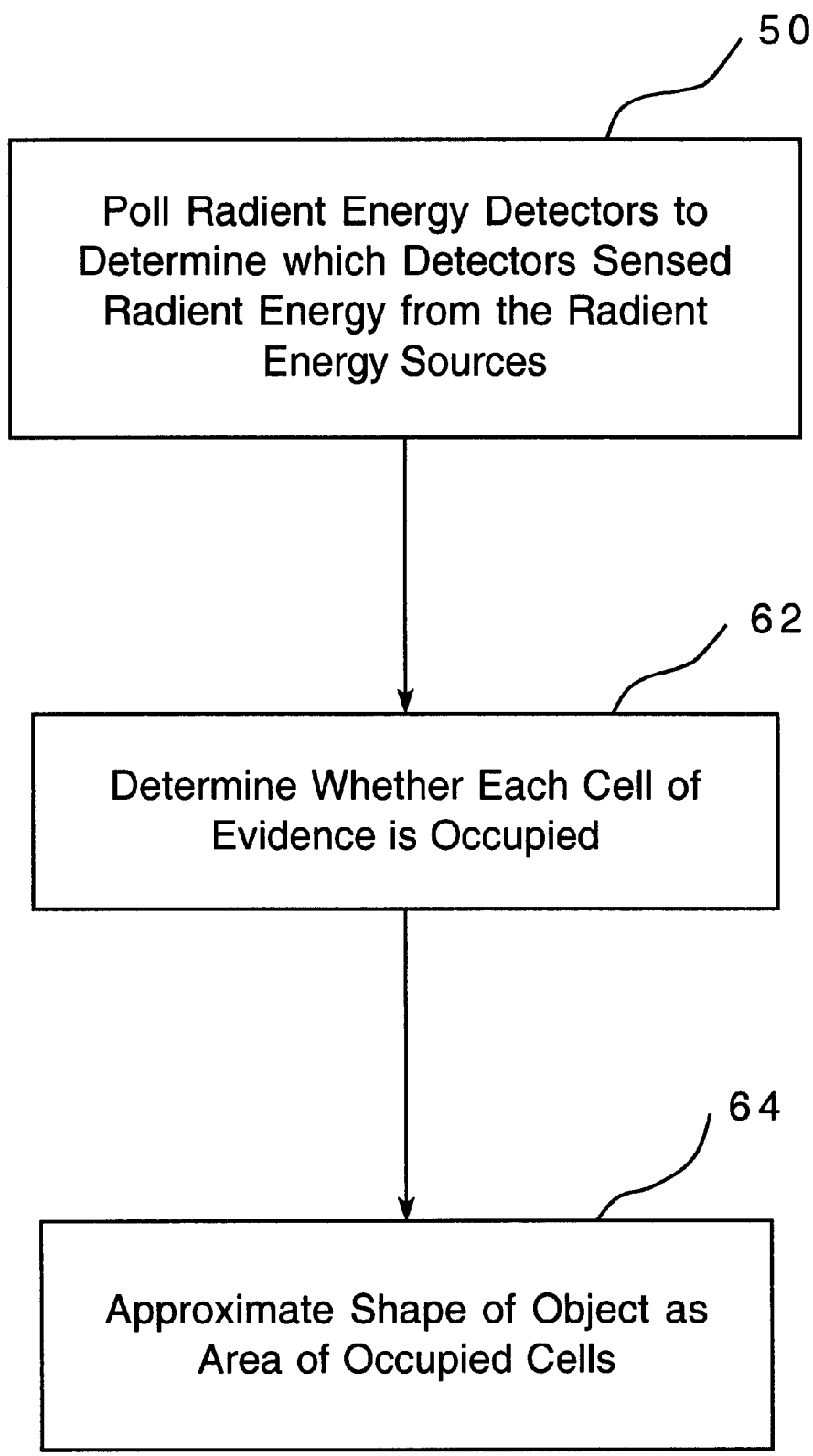
FIG. 13 is a block diagram of the process flow through the profile determination module of FIG. 2 according to another embodiment of the present invention.

FIG. 13 is a block diagram of the process flow through the profile determination module 34 according to another embodiment of the present invention, referred to as the "Histogram" method. The process flow begins at block 50, where radiant energy detectors 24 are polled to determine which of the detectors 24 sensed radiant energy from each of the radiant energy sources 22 as the sources 22 were strobed by the strobing module 32.

From block 50, the process flow proceeds to block 62, where it is determined whether each cell of an evidence grid representative of the two-dimensional space between the radiant energy sensors 22 and the radiant energy detectors 24 is occupied by the object 20. Whether a cell is occupied by the object 20 or not may determined statistically based upon whether the particular cell is within "the line of sight" between a threshold number of sensor 22/detector 24 pairs. For example, if a particular radiant energy detector 24 senses radiant energy emitted by a radiant energy source 22 when that source 22 is strobed, all cells within the line of sight for that particular source 22/detector 24 pair may be considered unoccupied by the object 20. Similarly, if a detector 24 is blocked from sensing the radiant energy emitted by a source 22, all cells within the line of sight for that particular source 22/detector 24 pair may be considered occupied. A value for each of the grid cells may be incremented for each of the source 22/detector 24 pairs for which the cell is within the line of sight. The value of each cell may be tallied, and each cell having a value greater than a threshold value may be considered to be unoccupied by the object.

Figure 14:
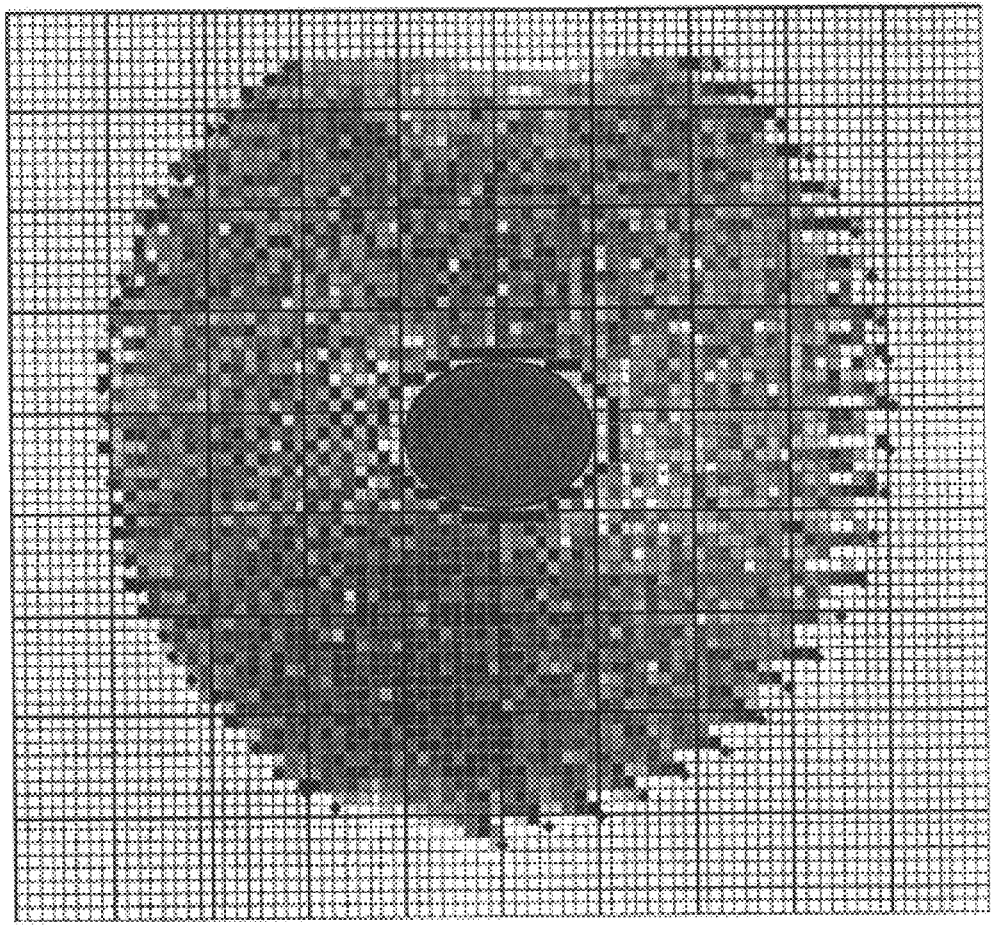
FIG. 14 is an example of a histogram for determining the cross-sectional area of an object according to one embodiment of the present invention.

Having determined whether each cell of the evidence grid is occupied, the process flow proceeds to block 64, where the cross-sectional area of the object 20 is estimated as, for example, the area of a congruous group of occupied cells. FIG. 14 is an example of an evidence grid for determining the shape of the object 20. For the evidence grid illustrated in FIG. 14, the shade of the cells is based on the cell's value—the darker the cell the greater the value. Also, in FIG. 14, the cross-sectional area of the object 20 is depicted. Greater resolution may be achieved by decreasing the area of the cells of the evidence grid.

Figure 15:
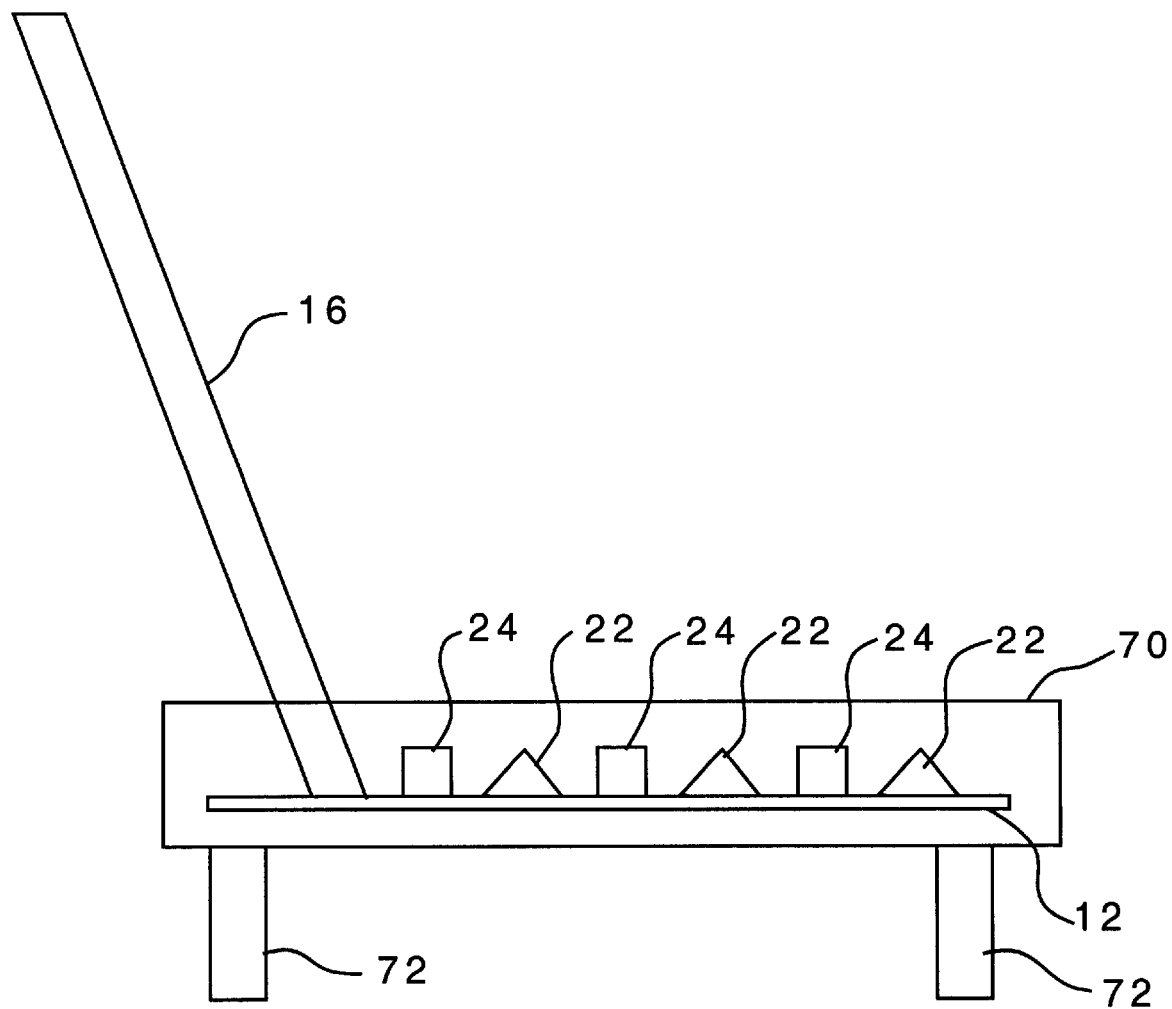
FIG. 15 is a side-view of the sensor head of the device of FIG. 1 according to another embodiment of the present invention.

FIG. 15 is a side-view of the sensor head 12 of the apparatus having a protective cover 70 and support legs 72. The protective cover 70 may protect the sensor head 12 from potential damage due to rough handling. In addition, the protective cover 70 may be sealed to protect the sensor head 12 from dust and moisture, and may be constructed from an opaque, translucent, or transparent material. Further, the protective cover 70 may be optically filtered and/or shaded to help limit the radiant energy detectors 24 from sensing radiant energy other than that emitted by the radiant energy sources 22.

The legs 72 may be utilized to position the sensor head 12 of the device 10 a certain distance (related to the length of the legs 72) relative to a surface, such as the ground. Thus, the legs 72 may be used to acquire more uniform readings of the cross-sectional areas of a number of objects 20, such as tree trunks, by measuring the cross-sectional area of the objects 20 in plane a uniform distance above the ground. The device 10 may include two or more legs 72.

Figure 16:
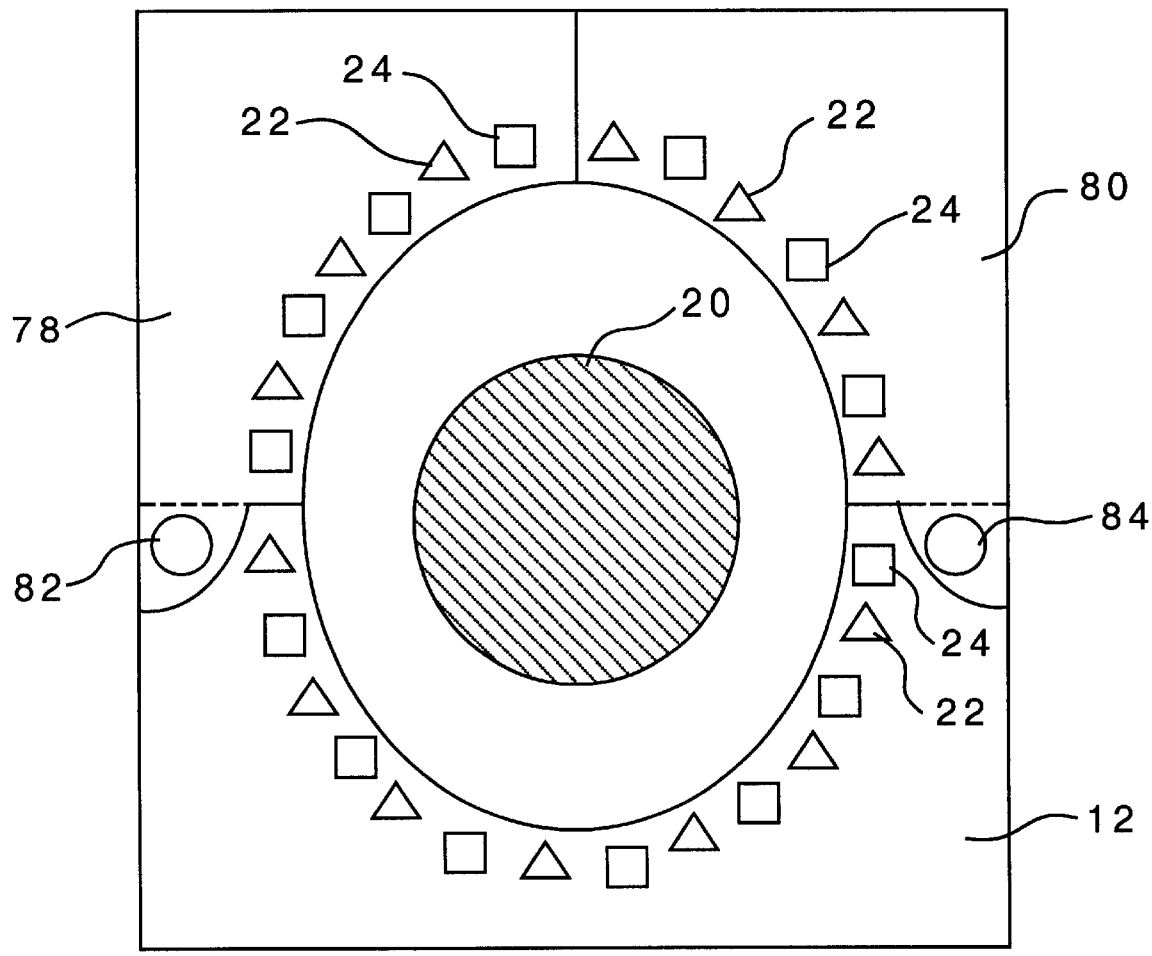
FIG. 16 is a top plan view of the sensor head of the device of FIG. 1 according to another embodiment of the present invention.

As discussed hereinbefore, the resolution of the cross-sectional area of the object 20 depends, in part, on the quantity and arrangement of the radiant energy sources 22 and radiant energy detectors 24. The resolution may be enhanced when the radiant energy sources 22 and the radiant energy detectors 24 are arranged to surround the object 20. FIG. 16 is a top plan view of the sensor head 12 according to one embodiment of the present invention which permits the radiant energy sources 22 and radiant energy detectors 24 to surround the object 20. According to such an embodiment, the sensor head 12 is connected to two rotatable sensor head members 78, 80, which may rotate relative to the sensor head 12 to close the opening 14 (see FIG. 1). Both rotatable sensor head members 78, 80 may include radiant energy sources 22 and radiant energy detectors 24 connected thereto. The rotatable sensor head members 78, 80 may be fastened to the sensor head 12 by, for example, pivot pins 82, 84 respectively to permit the rotation of the rotatable sensor head members 78, 80 relative to the sensor head 12. The rotatable sensor head members 78, 80 may be rotated about the pivot pins 82, 84 to close the opening 14 by, for example, tension cables (not shown) activated by, for example, a hand activation device connected to the handle 14.

Figure 17:
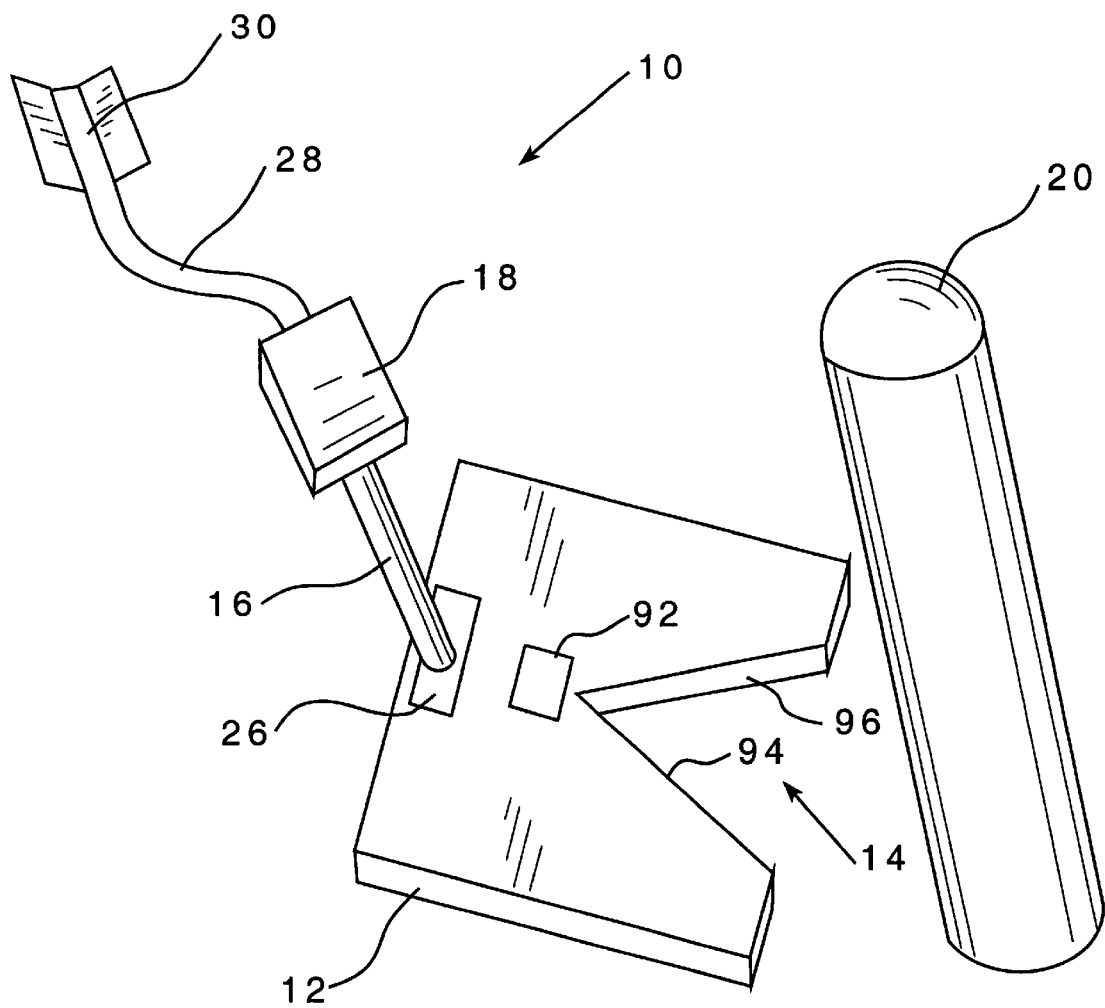
FIG. 17 is a diagram of the cross-sectional measurement device according to another embodiment of the present invention.

FIG. 17 is a diagram of the cross-sectional measurement device 10 according to another embodiment of the present invention. The device 10 illustrated in FIG. 17 is similar to the device 10 illustrated in FIG. 1, except that the opening 14 of the sensor head 12 is V-shaped. In addition, the device 10 includes a range finder 92 such as, for example, a laser range finder, positioned on the sensor head 12 a known distance from the vertex of the V-shaped opening 14. The range finder 92 measures the distance between the object 20 and the range finder 92 based on the amount of time it takes, for example, for one pulse of light to travel to the object 20 and back. To increase accuracy, the range finder 92 may measure the distance to the object 20 based on the time it takes several pulses to travel to the object 20 and back.

Figure 18:
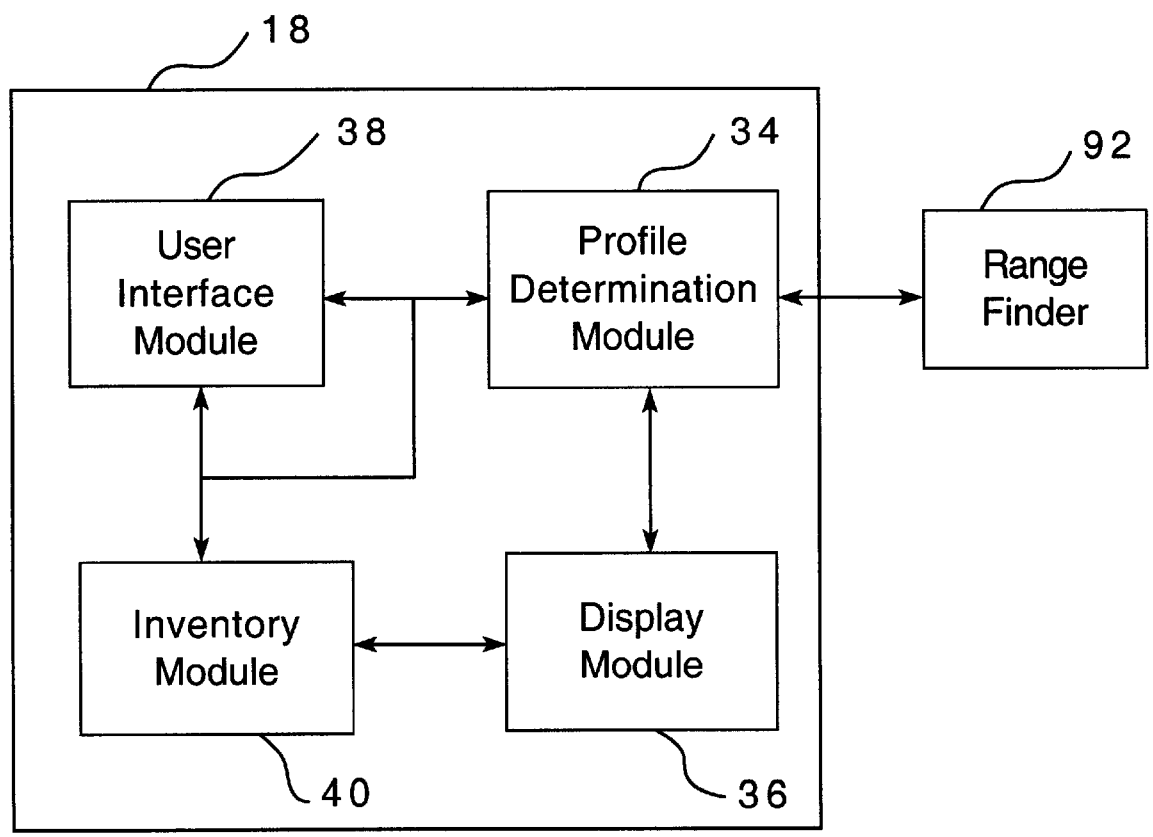
FIG. 18 is a block diagram of the controller of the device of FIG. 17 according to one embodiment of the present invention.

FIG. 18 is a block diagram of the controller 18 for the cross-sectional measurement device 10 illustrated in FIG. 17. For the controller 18 illustrated in FIG. 18, the profile determination module 34 is in communication with the range finder 92. The profile determination module 34 may estimate the cross-sectional area of the object 20 engaging both sides 94, 96 of the V-shaped opening 14 based on the distance from the object 20 to the vertex of the opening 14. The cross-sectional area of the object 20 may be estimated based on the distance between the object 20 and the range finder 92 (where the range finder 92 is a known distance from the vertex of the opening 14) and based on the angle between the sides 94, 96 of the opening 14, and by assuming a particular cross-sectional geometric shape for the object 20 such as, for example, circular. According to one embodiment, the profile determination module 34 may calculate the estimated cross-sectional area of the object 20 based on the input from the range finder 92. According to another embodiment, the profile determination module 34 may look up the estimated cross-sectional area of the object 20 from a table based on the input from the range finder 92. The table may be stored in the memory of the controller 18, or it may be stored in a peripheral memory device (not shown) in communication with the controller 18. Such an embodiment permits the consideration of any offsets or non-linearities of the range finder 92.

Although the present invention has been described in conjunction with certain embodiments, those of ordinary skill in the art will recognize that many modifications and variations of the present invention may be implemented. The foregoing description and the following claims are intended to cover all such modifications and variations.

What is claimed is:

1. An apparatus for determining a cross-sectional area of an object, comprising:
   a plurality of radiant energy sources;
   a plurality of radiant energy detectors oriented to receive radiant energy emitted by the plurality of radiant energy sources;
   a strobing module in communication with the plurality of radiant energy sources for strobing the plurality of light sources; and
   a profile determination module in communication with the plurality of radiant energy sources and the strobing module for determining the cross-sectional area of an object disposed between the plurality of radiant energy sources and the plurality of radiant energy detectors based on whether each cell of an evidence grid representative of the two-dimensional area between the plurality of radiant energy sources and the plurality of radiant energy detectors is occupied by the object.

2. The apparatus of claim 1, wherein the radiant energy sources and the radiant energy detectors are arranged in a linear paired arrangement.

3. The apparatus of claim 1, wherein the radiant energy sources and the radiant energy detectors are arranged in a linear non-paired arrangement.

4. The apparatus of claim 1, wherein the radiant energy sources and the radiant energy detectors are arranged in a non-linear non-paired arrangement.

5. The apparatus of claim 1, wherein the plurality of radiant energy sources are selected from the group consisting of a plurality of light emitting diodes, a plurality of diffused diode lasers, and a plurality of fluorescent lights.

6. The apparatus of claim 1, wherein the plurality of radiant energy detectors are selected from the group consisting of a plurality of photo-detectors and a plurality of infrared-detectors.

7. The apparatus of claim 1, further comprising a display module in communication with the profile determination module for displaying an image representative of the cross-sectional area of the object.

8. The apparatus of claim 1, further comprising a user interface module in communication with the profile determination module.

9. The apparatus of claim 8, further comprising an inventory module in communication with the profile determination module and the user interface module.

10. The apparatus of claim 1, further comprising a sensor head, and wherein the radiant energy sources and the radiant energy detectors are connected to the sensor head.

11. The apparatus of claim 10, further comprising a handle connected to the sensor head.

12. The apparatus of claim 10, further comprising a rotatable sensor head member rotatably connected to the sensor, wherein certain of the plurality of radiant energy sources and certain of the plurality of radiant energy detectors are connected to the rotatable sensor head member.

13. The apparatus of claim 10, wherein the radiant energy sources and the radiant energy detectors are connected to the sensor head such that they are arranged in a circular configuration.

14. An apparatus for determining a cross-sectional area of an object, comprising:

a plurality of radiant energy sources;

a plurality of radiant energy detectors oriented to receive radiant energy emitted by the plurality of radiant energy sources;

means for strobing the plurality of radiant energy sources; and means for determining the cross-sectional area of the object disposed between the plurality of radiant energy sources and the plurality of radiant energy detectors based on whether each cell of an evidence grid representative of the two-dimensional space between the plurality of radiant energy sources and the plurality of radiant energy detectors is occupied by the object.

15. The apparatus of claim 14, further comprising a sensor head, wherein the plurality of radiant energy sources and the plurality of radiant energy detectors are connected to the sensor head.

16. The apparatus of claim 15, wherein the radiant energy sources and the radiant energy detectors are connected to the sensor head such that they are arranged in a circular configuration.

17. The apparatus of claim 15, wherein the plurality of radiant energy sources and the plurality of radiant energy detectors are connected to the sensor head in a non-linear, non-paired arrangement.

18. The apparatus of claim 15, further comprising a handle connected to the sensor head.

19. The apparatus of claim 14, further comprising means for displaying an image representative of the cross-sectional area of the object.

20. A method of determining a cross-sectional area of an object, comprising:

strobing a plurality of radiant energy sources;

sensing radiant energy emitted by each of the plurality of radiant energy sources when strobed with at least one of a plurality of radiant energy detectors;

determining the cross-sectional area of the object disposed between the radiant energy sources and the radiant energy detectors based on whether the at least one of the plurality of radiant energy detectors senses radiant energy emitted from each of the plurality of radiant energy sources when strobed based on whether each cell of an evidence grid representative of the two dimensional space between the plurality of radiant energy sources and the plurality of radiant energy detectors is occupied by the object.

* * * * *

UNITED STATES PATENT AND TRADEMARK OFFICE
CERTIFICATE OF CORRECTION

PATENT NO.    : 6,480,290 B1  Page 1 of 1
DATED         : November 12, 2002
INVENTOR(S)   : Sanjiv Singh, Bruce Digney, Herman Herman and Michael Joseph Rondinelli It is certified that error appears in the above-identified patent and that said Letters Patent is hereby corrected as shown below:

<u>Column 8,</u>
Line 44, delete "as some" and substitute therefore with -- assuming --.

Signed and Sealed this

Nineteenth Day of August, 2003

JAMES E. ROGAN
*Director of the United States Patent and Trademark Office*